United States Patent [19]

Alderson et al.

[11] Patent Number: 4,988,325
[45] Date of Patent: Jan. 29, 1991

[54] TURKEY CALL

[76] Inventors: Franklin R. Alderson, 931 Mounts Rd.; Dennis E. Sherman, 955 Fayette St.; Hayes Harvey, R. D. #8, all of Washington, Pa. 15301

[21] Appl. No.: 296,672
[22] Filed: Jan. 13, 1989
[51] Int. Cl.⁵ ............................................. A63H 5/00
[52] U.S. Cl. .................................................... 446/397
[58] Field of Search ................ 446/397, 402, 404, 418
[56] References Cited

U.S. PATENT DOCUMENTS

| | | | |
|---|---|---|---|
| 2,025,181 | 12/1935 | Simon | 446/397 |
| 3,208,184 | 9/1965 | Wisor | 446/397 |
| 4,003,159 | 1/1977 | Piper | 446/397 |
| 4,041,639 | 8/1977 | Funk | 446/397 |
| 4,310,986 | 1/1982 | Jacobs | 446/397 |
| 4,648,852 | 3/1987 | Wingate | 446/397 |
| 4,662,858 | 5/1987 | Hall | 446/397 |

Primary Examiner—Robert A. Hafer

[57] ABSTRACT

A turkey call comprises a generally rectangular hollow box having an open end and having mounted on its top a hard, fine polishing stone, and a call striker comprising a hardwood dowel inserted into a hole in a vibration damper in close relationship to said hole in such a manner as not to contact the solid damping surface of the hole throughout a distance at least about four times the depth to which it is embedded in the damper.

5 Claims, 1 Drawing Sheet

TURKEY CALL

TECHNICAL FIELD

This invention relates to devices for calling male turkeys to attract them in the woods for hunting, photographing, and viewing; in particular it relates to a hand held device for generating a tone or sound which mimics that of a wild turkey, with the object of enticing the male turkey to move toward the operator of the device.

BACKGROUND OF THE INVENTION

Prior to the present invention, hunters and photographers have used many different devices, which have come to be known as "calls", and other ways to call the wild turkey into range for shooting or observing. Many calls are very expensive. Some electronic calls may cost thousands of dollars, but have been declared illegal to use in some states; others are inexpensive and are of a great variety of types, sizes and prices. Most require hours of practice in order to achieve a close reproduction of the wild turkey sounds; others, while easier to use, are specific to one or perhaps two types of calls that can be produced. Some are designed for one call only. Many prior art calls require frequent cleaning of the striking surface and the striker. Some require roughing of the surfaces as they become smooth and glazed with use. Some require using chalk as an anti-slip agent. While attempting to call a wild bird in close, it is absolutely necessary to make every call exact and true to tone, for a detectable deviation from a true mimic call can send a wise bird running for cover before the caller is aware of his presence. In U.S. Pat. No. 4,648,852 to Wingate, a turkey call construction is shown wherein a slate and a plastic tip on the striker rod are used. Slate had been employed in the prior art as far back as 1912, as recited by Wingate.

SUMMARY OF THE INVENTION

Our invention comprises the particular device described herein for mimicking turkey sounds, comprising a polishing stone, a mount for the polishing stone, and a striker rod of a configuration designed to permit both vibration and damping of the sound generated by scraping the rod on the stone.

With our call, particularly because of the choice of the polishing stone, and the design of the box-like stone support and the rod, very true and consistent calls can be made with a very minimum of practice. With a little practice several different calls are made, specifically the calls known to turkey hunters as the cluck, the purr, the yelp, and the cackle. These are all calls of the hen turkey. The strut call of the tom turkey can also be produced accurately.

The use of the polishing stone eliminates cleaning or chalking of the striker rod. The stone does require a very light sanding with fine sand paper after a very extended amount of use or being contaminated with body oils or other foreign materials. The polishing stone not only provides an excellent reproduction of a turkey sound when used with our striker rod, but is quite consistent in surface characteristics, unlike natural slate which tends to have imperfections and irregularities. We are not aware of any turkey or other game calls employing a polishing stone as the striking surface, neither is the manufacturer of the stone. Nor are we aware of any box call or striking rod made to our specifications. Our invention will be described in further detail below.

DETAILED DESCRIPTION OF THE INVENTION

The invention will be described with reference to the accompanying drawings, although it should be understood that the specific embodiment of the invention depicted in the drawings is only one of a number of variations which may be made within the scope of the claims.

Figure 1:
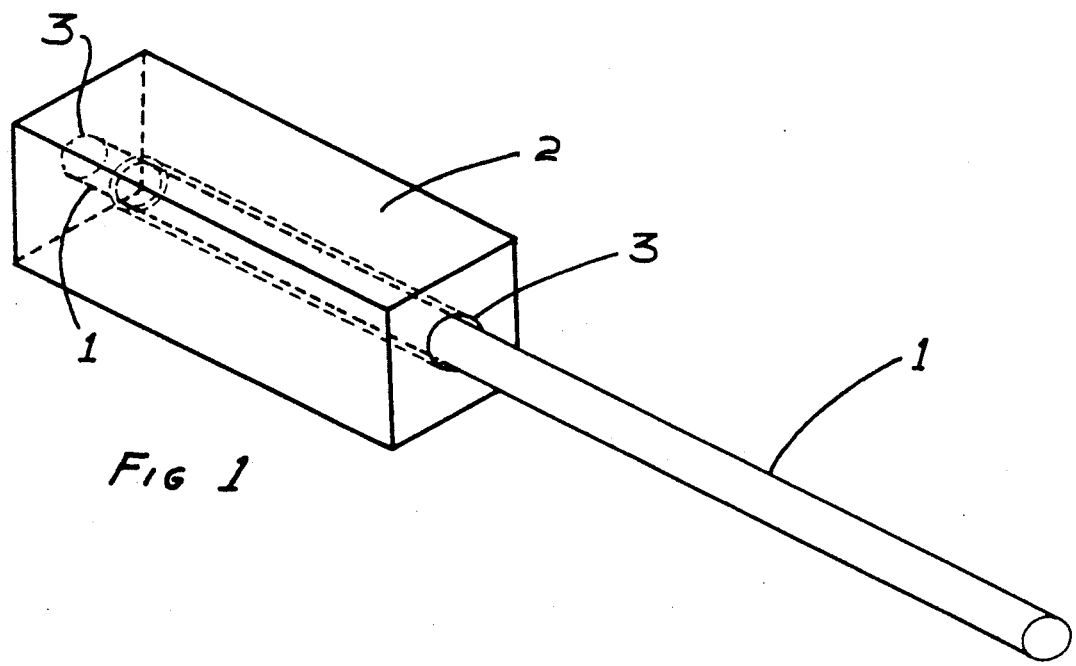
FIG. 1 shows a perspective view of the preferred embodiment of the striker.

In FIG. 1, it will be seen that the striker rod 1 is made of a hardwood dowel about ¼ inch in diameter. It is set into a square hardwood vibration damper 2 through a hole 3 slightly larger than the diameter of the dowel, in this case about 5/16" in diameter. Hole 3 is shown to have the 5/16" diameter for a distance of about 1⅜" and has an additional length of about ⅜" which fits into the body of the damper 2. This portion of hole 3 is originally drilled only about 15/64" so the striker rod 1 can be force fit into it. The 15/64" diameter portion of the hole 3 is thus about ⅜" long and preferably extends the remaining length of the vibration damper 2, i.e. so that it emerges from the end of the damper 2 but is filled with rod 1 to its end. Thus there is a clearance of about 1/32" around the striker rod 1 inside the damper 2. Damper 2 comprises a hardwood shell around the striker rod 1 but not touching it; the distance "covered" by the damper 2 or "shell" should be generally about three to about five times the depth to which the rod is embedded in the damper 2.

Figure 2:
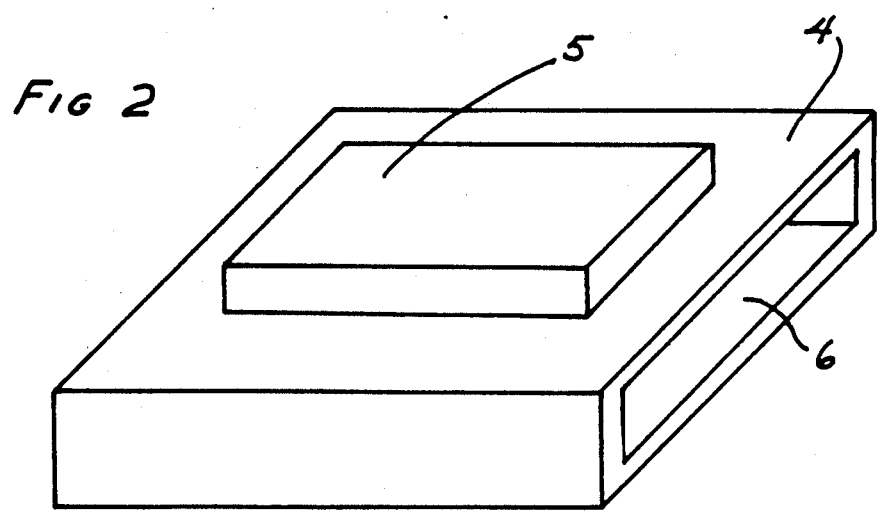
FIG. 2 shows a perspective view of the preferred embodiment of the hand-held box section.

In FIG. 2, the box portion of the turkey call is shown to comprise a rectangular wooden box 4 being in this case about 2 15/16" by about 2⅛" by about ⅝". The box 4 is shown to support a polishing stone 5 which in this case measures about two inches by about one inch, and is about ¼" thick. The preferred variation of FIG. 2 also shows that the stone is positioned about 9/16" from the side edges, but this of course can be varied considerably, normally about plus or minus one eighth inch. The front of box 4 is open and the rear has a closure 6. The thickness of the wood is preferred to be about 1/16" to about 3/16". Generally the wood should be a strong relatively hard wood.

The stone 5 is glued to the surface of the box 4 and/or may be slightly embedded in the box surface.

The polishing stone 5 is a commercially available artificial stone made mostly for use in polishing molds and dies, having a particle size (grit) of at least about 500, preferably about 600, meaning the particles are about one six hundredth of an inch in diameter on the average. The particles should be quite hard, i.e. made of silicon carbide, garnet or the like. Best results are obtained with a hardness of "N" (Falcon Tool Co.) or "6V" (Norton).

The wood need not be extraordinarily hard, but can include hickory, cedar, Philippine mahogany, and the like, i.e. it may advantageously be selected from the class of medium hardwoods.

We have employed our call numerous times with great success and have observed that new users can easily pick up the technique of simulating turkey calls even if they have never heard a turkey in the wild.

We claim:

1. A turkey call comprising a striking rod and a striking surface, said striking rod being made of hardwood and said striking surface being of a hard synthetic polishing stone, made of grit having a fineness of at least 500 particles to the inch.

2. A turkey call of claim 1 wherein the synthetic polishing stone is mounted on a hollow box having at least one opening.

3. A turkey call of claim 1 wherein the striking rod is a hardwood dowell and has a vibration damper comprising a hardwood shell surrounding but not touching a portion of said rod.

4. A turkey call of claim 2 wherein the striking rod is made of a medium hard wood.

5. A turkey call of claim 3 wherein the striking rod is imbedded into the vibration damper a distance of about one-fifth to about one-third of the length of said shell.

* * * * *